Oct. 16, 1956  H. D. JACOBY  2,766,996
WHEEL HUB COUPLING FOR IRRIGATION PIPELINE
Filed Feb. 23, 1954
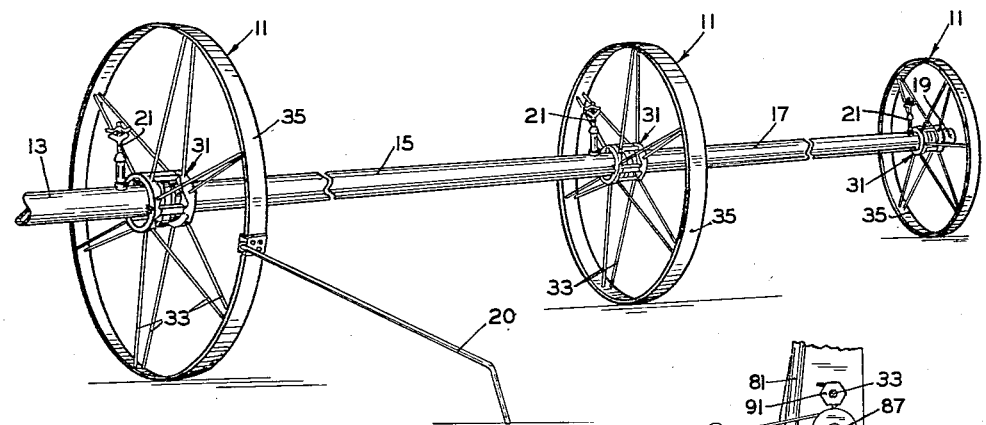
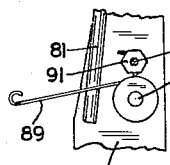
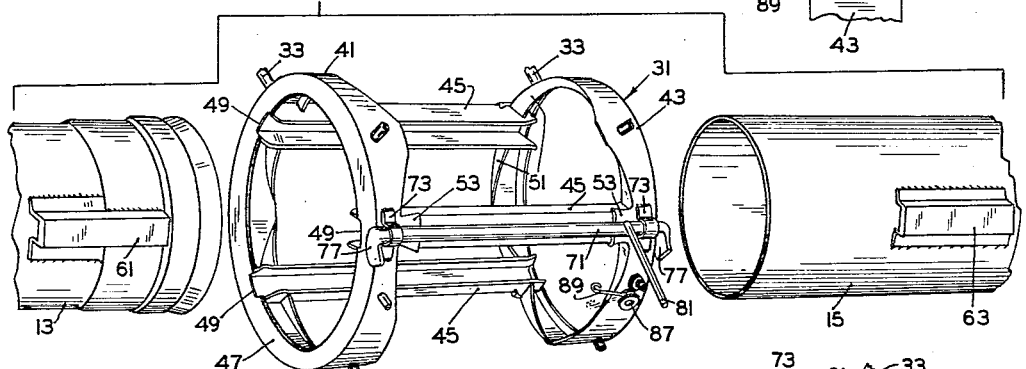
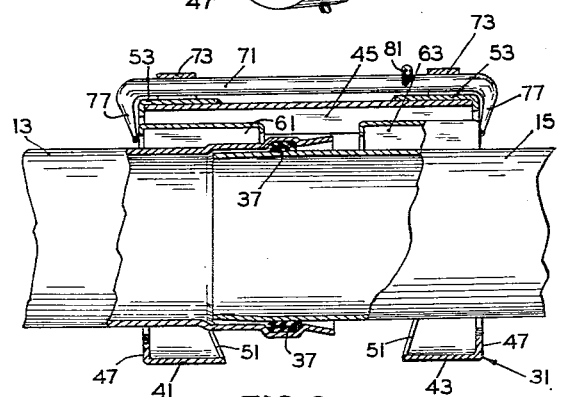
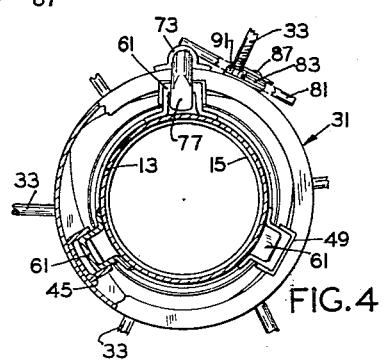
INVENTOR.
HARRY D. JACOBY
BY
Buckhorn and Cheatham
ATTORNEYS

United States Patent Office 2,766,996
Patented Oct. 16, 1956

2,766,996

WHEEL HUB COUPLING FOR IRRIGATION PIPELINE

Harry D. Jacoby, Eugene, Oreg., assignor to Irrigation Equipment Co., Inc., Eugene, Oreg., a corporation of Oregon Application February 23, 1954, Serial No. 411,767

5 Claims. (Cl. 285—5)

This invention relates to irrigation equipment and particularly to side roll irrigation units.

Conventionally, a side roll irrigation unit comprises a sectionalized pipeline wherein coupling devices couple the pipe sections together, the pipeline being supported by a plurality of spaced, concentrically arranged wheels. The pipeline is equipped with a plurality of spaced sprinkler outlets or nozzles, arranged upright during a sprinkling operation, whereby a strip of land adjacent the irrigation unit may be irrigated.

The coupling devices of prior irrigation units have been in general expensive and complicated. Although some of the prior coupling devices have been of simple form, they have required the use of expensive equipment for their construction.

It is a main object of the present invention to provide an improved coupling device for a side roll irrigation unit, and particularly to provide a coupling device having a novel hub which may readily be fabricated without the use of expensive equipment.

Another object of the present invention is to provide an improved coupling device having a single latch arrangement for preventing the separation of pipe sections joined by the coupling device.

It is a further object of the present invention to provide a novel side roll hub coupler comprising a minimum number of parts, which are light in weight and uniquely reinforced against excessive distortion or fracture.

Various other objects of the present invention will be apparent from the following description taken in connection with the accompanying drawings, wherein:

Fig. 1 is a perspective view of a portion of a side roll unit embodying the concepts of the present invention;

Fig. 2 is an enlarged perspective view of a hub of one of the side roll wheels disclosed in Fig. 1, showing associated therewith two pipe sections in position for insertion into the hub;

Fig. 3 is a longitudinal sectional view through a side roll wheel hub showing a pair of pipe sections being coupled together;

Fig. 4 is an end view of a side roll hub with pipe sections in place therein, parts being broken away for convenience in illustration;

Fig. 5 is a fragmentary view in plan, showing part of the latch mechanism.

Referring to the accompanying drawings, wherein similar reference characters designate similar parts throughout, Fig. 1 shows a portion of a side roll irrigation unit embodying the concepts of the present invention. The portion of the side roll unit disclosed includes three wheels, each being indicated generally by the reference numeral 11. Through the wheels extends a pipeline including pipe sections 13, 15, 17 and 19. Sections 13 and 15 are coupled together at the nearest wheel 11, as the parts are depicted in Fig. 1, sections 15 and 17 are coupled together at the middle wheel in Fig. 1, and sections 17 and 19 are coupled together at the most remote wheel in Fig. 1. One or more stabilizers or anchor arms 20 are provided along the length of the unit, one being shown in Fig. 1 and being detachably connected to the rim of the nearest wheel shown.

Each pipe section is provided with one or more sprinkler outlets or nozzles 21, one being shown for each pipe section. The sprinkler outlets are disposed in vertical longitudinal alignment so that during a sprinkling operation, the land adjacent both sides of the irrigation unit will be uniformly irrigated.

Referring particularly to Figs. 1, 2 and 3, each wheel includes a hub, indicated generally at 31, having spokes 33 secured at their opposite ends to the hub and to a wheel rim 35. The rim may be provided with lugs (not shown) for traction purposes.

Each hub is of cage-like construction designed to receive the adjacent ends of a pair of pipe sections, which are designed to telescope one within the other, as shown in the case of pipe sections 13 and 15 in Fig. 3. A gasket 37 is arranged to form a watertight seal between the telescoped ends of said pipe sections.

Each hub 31 includes two annular end members 41 and 43 secured in spaced coaxial relation by three circumferentially spaced, axially extending, inwardly directed channel elements 45. Each annular member comprises a heavy metallic band, initially of uniform width, having its outer margin bent inwardly to provide a flange 47. The ends of the channel elements 45 abut against the inner faces of the flanges 47, and the backs of the ends of the channel elements bear against the inner faces of the cylindrical portions of the annular members and are welded thereto. The flanges 47 are slightly recessed at 49 at places in register with the grooves of the channel elements 45.

The cage is reinforced against excessive torsional deflection by having a pair of triangular reinforcing tabs struck inwardly from the inner margin of cylindrical portion of each annular member, on opposite sides of the end of each channel element. These tabs are indicated at 51 and are welded to the sides of the channel elements. It is evident that there is left between each pair of triangular tabs a tongue 53, which extends along the back of and is secured to the associated channel element to further reinforce the cage.

Referring to Fig. 4, pipe section 13 has three axially extending, equally circumferentially spaced lugs 61 provided thereon, said lugs being formed by inwardly facing flanged channel elements welded to the exterior of the pipe section adjacent the end thereof. The lugs 61 are proportioned to slidably fit within the channel elements 45 without circumferential play between the lugs and channel elements. It is evident that the lugs 61 and channel elements 45 constitute a spline connection between the hub and pipe section 13. Pipe section 15 has similar lugs 63 provided thereon.

Referring to Fig. 3, the axial extension of lugs 61 and 63 are such that when the pipe sections are fitted together, as shown in Fig. 3, the distance between the remote ends of the lugs is less than that of the length of channel elements 45.

To prevent accidental separation of the pipe sections from the wheel hub, that is, withdrawal of lugs 61 from channels 45, a latch mechanism is provided. The latch arrangement includes a latch rod 71 pivotally mounted on the exterior of the cage along the back of one of the channel elements, said pivotal mounting being provided by a pair of spaced, inwardly directed, U-shaped brackets 73 through which the rod extends, said brackets being welded to the peripheries of the annular members 41 and 43.

The latch rod has its ends bent substantially normal to the length of such rod to provide stop portions 77. The stop portions may be swung to radial positions, see Fig. 3, blocking withdrawal of the lugs 61 and 63 from the channel elements 45, or to circumferential positions, see Fig. 2, to permit withdrawal of the lugs from the channel elements, and thus separation of the pipe sections from the hub and thus from the wheel.

For holding the latch rod in its operative latching position, there is provided a finger 81 fixed to the latch rod and extending at right angles therefrom, and disposed in a general circumferential direction when the stop portions 77 are in their operable lug blocking radial positions. To releasably hold the finger in such position, a torsion latch spring 83 is provided and has one end hooked around a spoke 33, has its intermediate portion coiled about and beneath the flange of a flanged stud 87, and its other end portion 89 projecting outwardly across and over and bearing against the finger 81, see Fig. 5. There is a nut 91 threaded on the just mentioned spoke down against the end of the torsion spring, coiled around the spoke, to clamp said end against the annular member.

When it is desired to release finger 81, end 89 of the torsion latch spring 83 is sprung beyond the end of the finger, that is, downwardly as the parts are shown in Figs. 2 and 5, and the finger rotated to swing the stop portions 77 to positions clear of the channels 45. The pipe sections may then be readily withdrawn from the hub of the wheel.

In operation, it is apparent that the pipe sections may be quickly and easily fitted within the hub of a side wheel and releasably held in such positions by the latch mechanism, or be readily separated therefrom by rendering the latch mechanism inoperative. Thus, a side roll irrigation unit of a desired length may be readily and quickly assembled for irrigating a selected plot of land. During such irrigation operation, if it becomes necessary to add to or remove sections from the side roll unit, this may be readily accomplished by merely swinging the latch rods to inoperative positions, and then removing one or more sections, as desired.

When it is considered that side roll irrigation units may extend to considerable length, to several thousand feet for instance, it is apparent that circumferential lost motion or play in the coupling devices would accumulate over the length of the pipeline, so that the sprinkler outlets on one end of the irrigation unit would be disposed differently than the unit on the other end. This would obviously result in non-uniform irrigation of the land adjacent the unit. However, with the present invention, since the lugs on the adjacent ends of a pair of pipe sections fit, without circumferential play, within the rigid channel elements 45, no such undesirable consequences as above mentioned will occur. Thus, extremely long side roll irrigation units can be assembled without danger of having the sprinkler outlets at one end disposed differently than at the opposite end.

It is pointed out that the side roll irrigation units are frequently used on rolling and hilly plots of land, and that under these circumstances severe strain is placed on the coupling devices. However, although the hubs of the wheels of the present invention are made from relatively light weight material, they are reinforced so as to carry these heavy torsional forces without being overstressed.

Having described the invention in what is considered to be the preferred embodiment thereof, it is desired that it be understood that the invention is not to be limited by the specific details shown unless they constitute critical features of the present invention, all of which will be apparent by reference to the following claims.

I claim:

1. A side roll irrigation assembly including a wheel having a hub provided by two annular members fixed in spaced coaxial relation by a plurality of circumferentially spaced axially extending, inwardly facing channel members secured to the annular members, a pair of pipe sections extending into the opposite ends of the hub, means providing a watertight seal between the adjacent ends of the pipe sections, the adjacent end of each pipe section having a plurality of lugs projecting therefrom fitting within the channel members, and a latch device carried by the hub and movable to an obstructing position with respect to the ends of the channel members to retain said pipe section against withdrawal from the hub.

2. A side roll irrigation assembly including a wheel having a hub provided by two annular members fixed in spaced coaxial relation by a plurality of circumferentially spaced axially extending, inwardly facing channel members secured to the annular members, each annular member including a cylindrical portion against the inner surface of which the backs of the channel members are secured, said cylindrical portions having parts struck inwardly to embrace the sides of the channel members and being secured to said sides, a pair of pipe sections extending into the opposite ends of the hub, means providing a watertight seal between the adjacent ends of the pipe sections, the adjacent end of each pipe section having a plurality of lugs projecting therefrom and fitting within the channel members, and a latch device carried by the hub and movable to an obstructing position with respect to the ends of the channel members to retain said pipe section against withdrawal from the hub.

3. A side roll irrigation assembly including a wheel having a hub provided by two annular members fixed in spaced coaxial relation by a plurality of circumferentially spaced axially extending, inwardly facing channel members secured to the annular members, each annular member including a cylindrical portion against the inner surface of which the backs of the channel members are secured, said cylindrical portion having portions struck inwardly to embrace the sides of the channel members and to leave a tab portion lying against the back of each channel member, said tabs and said embracing portions being secured to the back and sides respectively of the channel members, a pair of pipe sections extending into the opposite ends of the hub, means providing a watertight seal between the adjacent ends of the pipe sections, the adjacent end of each pipe section having a plurality of lugs projecting therefrom and fitting within the channel members, and a latch device carried by the hub and movable to an obstructing position with respect to the ends of the channel members to retain said pipe section against withdrawal from the hub.

4. A side roll irrigation assembly including a wheel having a hub provided by two annular members fixed in spaced coaxial relation by a plurality of circumferentially spaced axially extending, inwardly facing channel members secured to the annular members, each annular member including a cylindrical portion against the inner surface of which the backs of the channel members are secured, said cylindrical portion having portions struck inwardly to embrace the sides of the channel members and to leave a tab portion lying against the back of each channel member, said tabs and said embracing portions being secured to the back and sides respectively of the channel members, the remote margins of the annular members being bent inwardly to form reinforcing flanges, said flanges being secured to the ends of the channel members.

5. A side roll irrigation assembly wheel adapted to couple together two pipe sections having projecting lugs, said wheel having a hub provided by two annular members fixed in spaced coaxial relation by a plurality of circumferentially spaced axially extending, inwardly facing channel members secured to the annular members, and adapted to receive the lugs on the pipe sections to be coupled together, each annular member including a cylindrical portion against the inner surface of which the backs of the channel members are secured, said cylindrical portion having portions struck inwardly to embrace the sides of the channel members and to leave a tongue portion lying against the back of each channel member, said tongues and said embracing portions being secured to the backs and sides respectively of the channel members, said embracing portions of each annular member having a maximum radial depth at the sides of the channel members and tapering circumferentially to merge into the cylindrical portion of the annular member.

References Cited in the file of this patent

UNITED STATES PATENTS

| | | |
|---|---|---|
| 2,441,754 | Cobi | May 18, 1948 |
| 2,516,711 | Mansur | July 25, 1950 |
| 2,665,169 | Tipton | Jan. 5, 1954 |